(12) United States Patent
Morin (10) Patent No.: US 7,445,834 B2
(45) Date of Patent: Nov. 4, 2008

(54) POLYPROPYLENE FIBER FOR REINFORCEMENT OF MATRIX MATERIALS

(76) Inventor: Brian G. Morin, 8 New Forest Ct., Greenville, SC (US) 29615

( * ) Notice: Subject to any disclaimer, the term of this patent is extended or adjusted under 35 U.S.C. 154(b) by 491 days.

(21) Appl. No.: 11/149,887

(22) Filed: Jun. 10, 2005

(65) Prior Publication Data

US 2006/0280924 A1   Dec. 14, 2006

(51) Int. Cl.
  *B32B 17/12* (2006.01)
(52) U.S. Cl. .................. 428/293.7; 428/294.7
(58) Field of Classification Search .......... 428/293.7, 428/294.7, 364, 394, 292.1
  See application file for complete search history.

(56) References Cited

U.S. PATENT DOCUMENTS

| | | | |
|---|---|---|---|
| 4,536,536 A * | 8/1985 | Kavesh et al. ............... 524/462 |
| 4,689,084 A | 8/1987 | Ambroise et al. |
| 4,935,301 A | 6/1990 | Rerup et al. |
| 4,968,561 A | 11/1990 | Mizobe et al. |
| 4,979,992 A | 12/1990 | Bache |
| 5,064,785 A | 11/1991 | Kawamoto et al. |
| 5,114,653 A * | 5/1992 | Schuerhoff et al. ......... 264/228 |
| 5,330,827 A * | 7/1994 | Hansen .................... 428/294.7 |
| 5,399,195 A | 3/1995 | Hansen et al. |
| 5,456,752 A | 10/1995 | Hogan |
| 5,489,333 A | 2/1996 | Soroushian et al. |
| 5,628,822 A | 5/1997 | Hogan |
| 5,736,244 A | 4/1998 | Kavesh et al. |
| 5,846,316 A | 12/1998 | Rice |
| 5,846,654 A | 12/1998 | Modrak |
| 5,955,196 A | 9/1999 | Sakellerides |
| 5,972,498 A | 10/1999 | Kavesh et al. |
| 5,976,670 A | 11/1999 | Fugazzi |
| 5,993,537 A | 11/1999 | Trottier et al. |
| 6,102,999 A * | 8/2000 | Cobb et al. ................ 106/243 |
| 6,110,588 A | 8/2000 | Perez et al. |
| 6,162,845 A | 12/2000 | Freed |
| 6,281,289 B1 | 8/2001 | Maugans et al. |
| 6,331,343 B1 | 12/2001 | Perez et al. |
| 6,340,522 B1 | 1/2002 | Burke et al. |
| 6,372,038 B1 | 4/2002 | Kameta et al. |
| 6,420,024 B1 | 7/2002 | Perez et al. |
| 6,423,134 B1 | 7/2002 | Trottier et al. |

(Continued)

OTHER PUBLICATIONS

Article—*High Modulus/Tenacity Filaments from Blends of Different Molecular Weights of Polypropylene*, Chatterjee et al., Journal of Applied Polymer Science, vol. 96, 2005, pp. 1021-1028.

(Continued)

*Primary Examiner*—N Edwards
(74) *Attorney, Agent, or Firm*—Wyatt, Tarrant & Combs, LLP (57) ABSTRACT

Disclosed are structural materials including polymeric reinforcment fibers that can provide added strength and fracture toughness to the matrix. The polymeric reinforcement fibers are polypropylene-based monofilament fibers or tape fibers exhibiting extremely favorable mechanical characteristics for structural reinforcement including modulus greater than 12 MPa and elongation less than about 10%. The disclosed reinforced composite materials can exhibit desired average residual strength values with less total fiber loading necessary to attain the ARS values as compared to previously known polymer reinforced materials. Very high strength and fracture toughness can be attained in the disclosed composite materials.

13 Claims, 6 Drawing Sheets

U.S. PATENT DOCUMENTS

| | | | |
|---|---|---|---|
| 6,432,532 B2 | 8/2002 | Perez et al. | |
| 6,468,451 B1 | 10/2002 | Perez et al. | |
| 6,534,574 B1 | 3/2003 | Zhao et al. | |
| 6,541,554 B2* | 4/2003 | Morin et al. | 524/387 |
| 6,569,232 B2 | 5/2003 | Castro et al. | |
| 6,569,525 B2 | 5/2003 | Rieder et al. | |
| 6,569,526 B2 | 5/2003 | Rieder et al. | |
| 6,582,511 B1 | 6/2003 | Velpari | |
| 6,586,073 B2 | 7/2003 | Perez et al. | |
| 6,630,231 B2 | 10/2003 | Perez et al. | |
| 6,645,618 B2 | 11/2003 | Hobbs et al. | |
| 6,680,114 B2 | 1/2004 | Kody et al. | |
| 6,692,823 B2 | 2/2004 | Kody et al. | |
| 6,723,267 B2 | 4/2004 | Simmelink et al. | |
| 6,753,081 B1* | 6/2004 | Lovett et al. | 428/373 |
| 6,758,897 B2 | 7/2004 | Rieder et al. | |
| 6,759,124 B2* | 7/2004 | Royer et al. | 428/372 |
| 6,794,033 B2* | 9/2004 | Morin et al. | 428/394 |
| 6,863,976 B2 | 3/2005 | Morin et al. | |
| 6,916,533 B2 | 7/2005 | Simmelink et al. | |
| 6,999,081 B1* | 2/2006 | Lin et al. | 345/440.2 |
| 7,074,483 B2* | 7/2006 | Morin | 428/364 |
| 7,128,965 B2* | 10/2006 | Famy et al. | 428/297.4 |
| 7,192,643 B2* | 3/2007 | Perez et al. | 428/400 |
| 2001/0050032 A1 | 12/2001 | Dry | |
| 2003/0044592 A1* | 3/2003 | Perez et al. | 428/294.7 |
| 2004/0096654 A1 | 5/2004 | Morin et al. | |
| 2004/0096661 A1 | 5/2004 | Royer et al. | |
| 2005/0019565 A1 | 1/2005 | Morin et al. | |
| 2005/0072056 A1* | 4/2005 | Famy et al. | 52/21 |
| 2006/0280924 A1* | 12/2006 | Morin | 428/292.1 |

OTHER PUBLICATIONS

Shotcrete Magazine (A quarterly publication of the American Shotcrete Association)—Fiber Technology, vol. 6, No. 4, Fall 2004, 4 pages.

Brian G. Morin, U.S. Appl. No. 10/983,153, filed Nov. 5, 2004, Melt-Spun Multifilament Polyolefin Yarn Formation Processes And Yarns Formed Therefrom.

PCT Search Report for PCT/US/06/21201, Aug. 31, 2007.

* cited by examiner

POLYPROPYLENE FIBER FOR REINFORCEMENT OF MATRIX MATERIALS

BACKGROUND OF THE INVENTION

Polymeric yarns and fibers can offer many desirable characteristics in a wide variety of applications. For example, they can possess good mechanical qualities such as modulus, they can be resistant to degradation and erosion, and the raw materials can be easy to obtain as well as fairly inexpensive. As such, monofilament fibers, tapes, and yarns have been formed from various polyolefins such as polypropylene, polyethylene, and polyesters. These materials have found use in many industries, including medical industries, for example as suture material, filtration material, and the like, and in textiles, for instance as carpet backing material and in the formation of geotextiles.

Industries which encompass formation of structures requiring long term strength and stability, such as the construction industry for example, have also begun to take advantage of the benefits of polymeric fibers, and in particular, polypropylene-containing fibers. For instance, the construction industry has increasingly recognized the benefits of using such materials as reinforcement for various structural matrix materials such as concrete, asphalt, adhesives, other polymers, and elastomeric materials, to name just a few. Particularly in those fields which in the past have utilized steel reinforcement materials, polymeric reinforcement materials are increasingly becoming more attractive due to the ever-increasing costs associated with steel.

Attempts have been made to improve the reinforcement capability of fibrous polymeric materials through chemical methods, e.g., formation of particular polymeric blends, as well as through physical methods, such as by forming the fibers to have particular cross-sectional shapes or particular longitudinal shapes incorporating hooks, fibrillations, curves, and the like to better anchor the reinforcement fibers within the matrix.

While there have been improvements in fiber formation processes as well as in the formed polymeric materials and the composite materials incorporating the fibrous polymeric materials, there remains room for further improvement and variation within the art.

SUMMARY OF THE INVENTION

The present invention is directed in one embodiment to a composite material including a matrix material and a plurality of polypropylene-based fibers throughout the matrix material, and in particular, polypropylene-based monofilament fibers or tape fibers. In another embodiment, the present invention is directed to methods of forming the disclosed composite materials. In one embodiment, the fibers of the disclosed composite materials can include only polypropylene homopolymers and/or copolymers as the polymeric component of the fibers. In another embodiment, however, the polymeric component can include one or more polypropylene polymers in a blend with other polymers.

In one embodiment, the fibers within the matrix can have an elastic modulus greater than 12 GPa and an elongation less than about 10%. In another embodiment, the fibers can describe a higher modulus, for example, greater than about 16 GPa. In one embodiment, the fibers of the invention can have an elastic modulus of about 18 Gpa, or higher yet, for instance greater than about 20 GPa. The fibers can describe a lower elongation in some embodiments, for instance less than about 8%, or less than about 6%, in other embodiments. Optionally, the fibers can be cut, fibrillated, or deformed, which can further improve the characteristics of the composite materials. For example, in one embodiment, the fibers can be cut to a length of less than about 5 inches and disbursed throughout the matrix. Optionally, the disclosed fibers can be deformed, either prior to mixing with the matrix material, or during the mixing process.

The matrix material of the disclosed composites can be any matrix material that can benefit from the presence of the added fibers. For example, the matrix material can be an organic or an inorganic matrix material. In one embodiment, the matrix material can be an inorganic structural matrix material, for example a concrete or a gypsum structural matrix material.

The composite materials including the disclosed fibers can exhibit excellent strength and fracture toughness characteristics. For example, at relatively low fiber loading values of between about 2 lbs/cy and about 4 lbs/cy, the disclosed composite materials can have higher average residual strength (ARS) values than many previously known polymeric reinforced composites, and in one particular embodiment, greater than 0.8 MPa.

In one embodiment, the composites can exhibit an ARS greater than 1.75 MPa, or greater yet, such as greater than about 1.8 MPa at fiber loading levels of less than 10 lbs/cy. In other embodiments, the disclosed composite materials can have very high strength and fracture toughness characteristics. For example, at fiber loading levels between about 5 and about 7 lbs/cy, the disclosed composite materials can exhibit ARS of greater than about 1.5 MPa. In other embodiments, the composite materials can exhibit ARS greater than about 2.0 MPa at fiber loading levels of less than about 14 lbs/cy. The disclosed materials can also have high compressive strength values, for example greater than about 50 MPa, in one embodiment.

The polypropylene fibers of the present invention can also exhibit high crystallinity. For example, the polypropylene homopolymer monofilaments of the invention can exhibit greater than 80% crystallinity according to known WAXS measuring techniques.

In one embodiment, the fibers of the disclosed composite materials can have a ratio of equatorial intensity to meridonal intensity greater than about 1.0 according to known SAXS measuring techniques. This ratio can be higher in other embodiments, for instance, greater than 1.5, or higher yet, for instance, greater than 3.0.

If desired, the composite material of the present invention can also include other types of reinforcement fibers. For example, the disclosed materials can include one or more types of fibers such as steel fibers, carbon fibers, poly-par-aphenylene terephthalamide fibers, ultra-high molecular weight polyethylene fibers, liquid crystal fibers, polyvinyl alcohol fibers, and glass fibers.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying Figures in which.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used in another embodiment to yield a still further embodiment. Thus, it is intended that the present invention cover such modifications and variations as come within the scope of the appended claims and their equivalents.

In one embodiment, the present invention is directed to composite materials incorporating polymeric monofilament fibers, polymeric tape fibers, and methods for forming the disclosed fibers. The composite materials formed according to the disclosed processes can show improved mechanical characteristics as compared to previously known composite materials incorporating other polymeric monofilament fibers and tape fibers.

For purposes of this disclosure, a monofilament fiber is herein defined to refer to a fiber that has been extruded or spun from a melt as an individual fiber. That is, while the extruded monofilament fiber can be subjected to post-extrusion processing (e.g., quenching, drying, drawing, heat processing, finish application, etc.), the fiber will be initially extruded or spun from a melt in the individual fiber form. A tape fiber, on the other hand, is intended to refer to fibers that have been formed from a larger section during post-extrusion processing. For example, the term 'tape fiber' can encompass fibers that have been cut or otherwise separated from a larger extruded film, for instance an extruded flat film or a film extruded as a cylinder. In general, tape fibers can have a clear delineation between adjacent sides of the fibers, with a clear angle between the adjacent sides, as they can usually be formed by cutting or slicing individual fibers from the larger polymer section, but this is not a requirement of the invention. For example, in one embodiment, individual tape fibers can be pulled from a larger polymeric piece, and thus may not show the sharper angles between adjacent edges that may be common to a tape fiber that has been cut from a larger piece of material.

In one embodiment, the present invention is directed to methods for incorporating the disclosed fibers into composite materials as well as to the products and composite materials that can beneficially include the fibers. According to one particular embodiment of the invention, the disclosed fibers can be utilized to add strength to the matrix of a composite structural material. According to this embodiment, the fibers, when incorporated in the composite, can strengthen and reinforce the structural matrix.

The monofilament fibers and tape fibers of the present invention are polypropylene-based materials. In certain embodiments, described in more detail below, the fibers of the invention can be formed with one or more polypropylene homopolymers and/or copolymers as the only polymeric component of the fibers. This is not a requirement of the present invention, however, and in other embodiments, the disclosed processes can be utilized to form monofilament fibers or tape fibers exhibiting desired physical characteristics from polypropylene blends, for example polypropylene/polyethylene blends.

For purposes of this disclosure, the term polypropylene is intended to include any polymeric composition comprising propylene monomers, either as a homopolymer or copolymer with other polyolefins, dienes, or other monomers (such as ethylene, butylene, and the like). The term is also intended to encompass any different configuration and arrangement of the constituent monomers (such as syndiotactic, isotactic, and the like). Thus, the term as applied to monofilament fibers or tape fibers is intended to encompass actual long strands, tapes, threads, and the like, of polypropylene homopolymer or copolymer.

Figure 1:
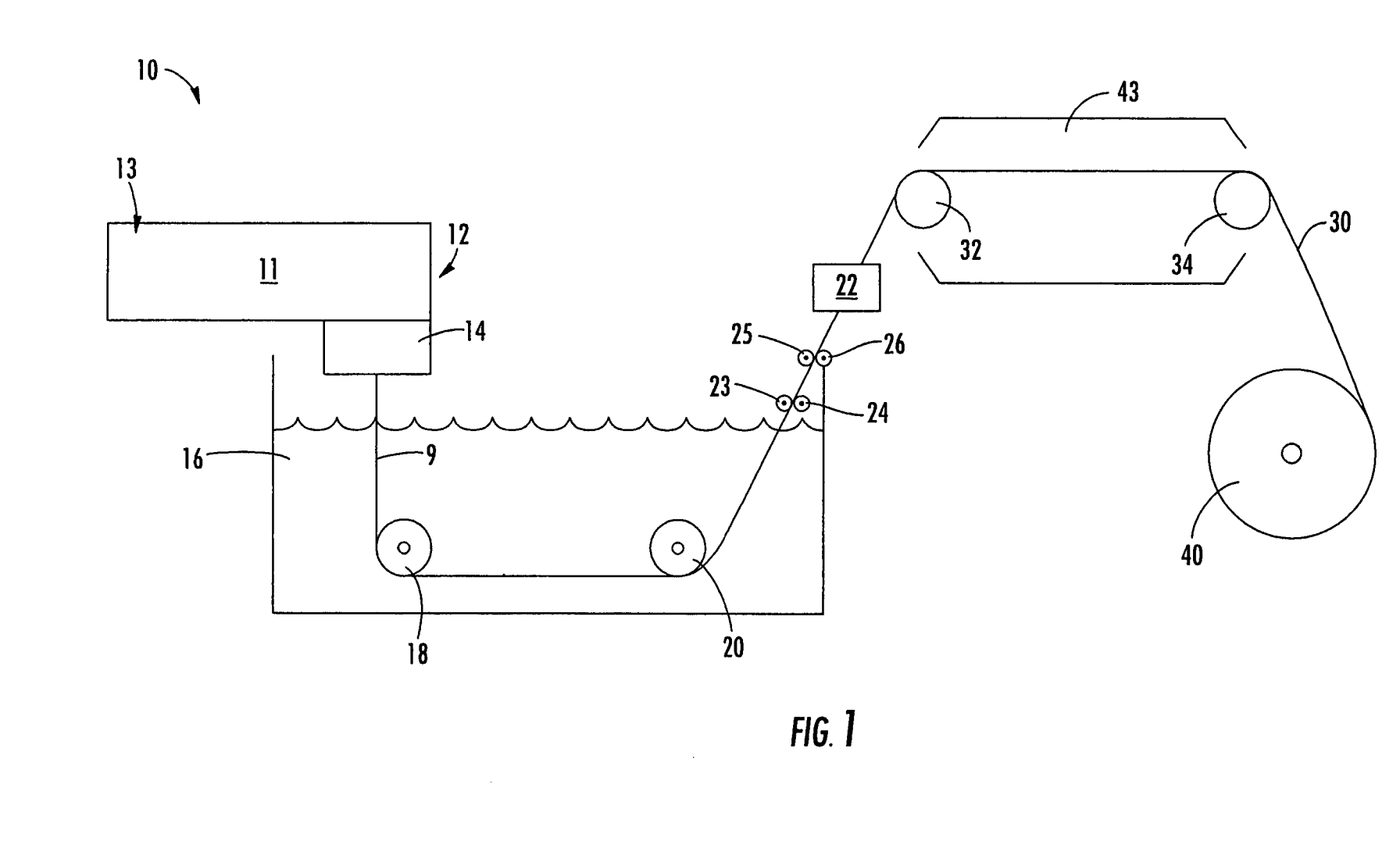
FIG. 1 is a schematic diagram of one embodiment of a process according to the present invention.

Referring to FIG. 1, one embodiment of the presently disclosed process generally 10 is schematically illustrated. According to the illustrated embodiment, a polypropylene-based melt can be provided to an extruder apparatus 12. Generally, any polypropylene suitable for forming drawn film or fibers can be utilized in the disclosed process. For instance, polypropylene suitable for the present invention can generally be of any standard melt flow. For example, in one embodiment, standard extrusion grade polypropylene resin possessing ranges of melt flow indices (MFI) between about 0.2 and about 50 can be utilized in forming the disclosed fibers. In one embodiment, polypropylene possessing an MFI between about 0.5 and about 25 can be utilized. In one embodiment, the polypropylene utilized in forming the fibers can have an MFI between about 1 and about 15. In another embodiment, the polypropylene can have an MFI between about 1 and about 12. In another embodiment, the MFI can be between about 1 and about 8.

In one embodiment, the polymeric composition provided to the extruder apparatus 12 can include polypropylene and a nucleating agent. According to this embodiment, the nucleating agent can generally be any material that can provide nucleation sites for the polypropylene crystals that can form during the transition of the polypropylene from the molten state to the solid structure. In one embodiment, the nucleating agent can exhibit high solubility in the polypropylene, though this is not a requirement of the invention. A non-limiting list of exemplary nucleating agents can include, for example, dibenzylidene sorbitol nucleating agents, as are generally known in the art, such as dibenzylidene sorbitol (DBS), monomethyldibenzylidene sorbitols such as 1,3:2,4-bis(p-methylbenzylidene) sorbitol (p-MDBS), dimethyl dibenzylidene sorbitols such as 1,3:2,4-bis(3,4-dimethylbenzylidene) sorbitol (3,4-DMDBS), and the like. Other suitable nucleating agents can include sodium benzoate, phosphate ester salts, such as NA-11 and NA-21, developed by Asahi Denka of Japan, or the hyper nucleating agents developed by Milliken Chemical of South Carolina such as, for example, Hyperform® HPN-68L.

The individual components of a polymeric composition for forming the product fibers can be provided to the extruder either separately or together, as at an inlet 13. For example, individual components such as one or more polypropylene resins and a nucleating agent can be provided to the extruder 12 either separately or together in liquid, powder, or pellet form. In one embodiment, both a polypropylene resin and a nucleating agent can be provided in pellet form and fed to the extruder 12 at inlet 13. In another embodiment, a nucleating agent can be provided to the process as a liquid. For example, liquid nucleating agents such as those disclosed in U.S. Pat. No. 6,102,999 to Cobb, III, et al., which is incorporated herein by reference, can be utilized in the process.

When included, a nucleating agent can generally be present in the mixture to be extruded in an amount less than about 1% by weight of the composition. For example, a nucleating agent can be present in the mixture in an amount less than about 0.5% by weight. In one embodiment, a nucleating agent can be present in the mixture in an amount between about 0.01% by weight and about 0.3% by weight. In another embodiment, a nucleating agent can be present in the mixture in an amount between about 0.05% by weight and about 0.25% by weight.

The mixture including the polypropylene resin and, optionally, a nucleating agent can also include various other additives as are generally known in the art. For example, in one embodiment, the disclosed monofilament fibers can be of a certain color, and the mixture can include suitable coloring agents, such as dyes or other pigments. According to this embodiment, it may be preferable to utilize a nucleating agent that will not affect the final color of the fibers, but this is not a requirement of the invention, and in other embodiments, nucleating agents can be utilized that enhance or otherwise affect the color of the formed fiber. Other additives that can be combined with the mixture can include, for example, one or more of anti-static agents, antioxidant agents, antimicrobial agents, adhesion agents, stabilizers, plasticizers, brightening compounds, clarifying agents, ultraviolet light stabilizing agents, surface active agents, odor enhancing or preventative agents, light scattering agents, halogen scavengers, and the like. In addition, additives can be included in the melt, or in some embodiments, can be applied as a surface treatment to either the undrawn fiber or optionally to the drawn fiber, as generally known in the art.

In one embodiment, the polypropylene fibers of the invention can be formed of a blend of polyolefins, one of which can be a polypropylene. For example, the polyolefin can be combined in the extruder apparatus with a second polymer. The second polymer can be a different polypropylene or another polyolefin altogether, as desired. In one embodiment, the polymeric component of the fibers can be formed of a polypropylene/polyethylene blend. In other embodiments, other polymers can be blended with the polypropylene. For instance, in one embodiment, a polypropylene fiber of the invention can be formed of a polypropylene/cyclic polyolefin blend.

In one embodiment, the extruder apparatus 12 can be a melt spinning apparatus as is generally known in the art. For example, the extruder apparatus 12 can include a mixing manifold 11 in which a composition including at least one polypropylene resin, optionally one or more additional polyolefins and any other desired additives can be mixed and heated to form a molten composition. The formation of the molten mixture can generally be carried out at a temperature so as to ensure melting of essentially all of the polypropylene. For example, in one embodiment, the mixture can be mixed and melted in a manifold 11 heated to a temperature of between about 175° C. and about 325° C.

Optionally, to help ensure the fluid state of the molten mixture, in one embodiment, the molten mixture can be filtered prior to extrusion. For example, the molten mixture can be filtered to remove any fine particles from the mixture with a filter of between about 180 and about 360 gauge.

Following formation of the molten mixture, the mixture can be conveyed under pressure to the spinneret 14 of the extruder apparatus 12, where it can be extruded through an orifice to form the fiber 9. As discussed above, the mixture can be extruded as either a monofilament fiber 9, as shown in FIG. 1, or as a film, for instance in either a sheet orientation or in a cylindrical orientation, and cut or sliced into individual tape fibers during post-processing of the film. In particular, while the majority of the ensuing discussion is specifically directed to the formation of a monofilament fiber, it should be understood that the below described processes are also intended to encompass the formation of a film for subsequent formation of a tape fiber.

The spinneret 14 can generally be heated to a temperature that can allow for the extrusion of the molten polymer while preventing breakage of the fiber 9 during formation. In one embodiment, the melt can be extruded at temperatures higher than those normally used in monofilament formation processes found in the past. For example, in one embodiment, the spinneret 14 can be heated to a temperature of between about 175° C. and about 350° C. In one embodiment, the spinneret 14 can heated during the extrusion process to a temperature between about 250° C. and about 325° C. In one embodiment, the spinneret 14 can be heated to the same temperature as the mixing manifold 11. This is not a requirement of the process, however, and in other embodiments, the spinneret 14 can be at a different temperature than the mixing manifold 11. For example, in one embodiment, increasing temperatures can be encountered by the mixture as it progresses from the inlet to the mixing manifold to the spinneret. In one embodiment, the mixture can progress through several zones prior to extrusion, for example a first zone, in which the temperature can be relatively low, for instance between about 75° C. and about 150° C., a second zone, in which the temperature can be between about 125° C. and about 275° C., and a third zone at the spinneret, which can optionally include both the spin head and the spin die that can be held at a temperature between about 175° C. and about 350° C. at which the melt can be extruded.

When forming a monofilament fiber, the spinneret orifice through which the polymer can be extruded can generally be less than about 0.10 inches in maximum cross-sectional distance (e.g., diameter in the particular case of a circular orifice). For example, in one embodiment, the spinneret orifices can be between about 0.012 inches and about 0.05 inches in maximum cross-sectional distance.

When forming a film, the film die can be of any suitable orientation and length, and can be set to a thickness of between about 0.012 inches and about 0.10 inches. For example, in one embodiment, the film die can be set at a width of between about 0.012 inches and about 0.05 inches.

According to the present invention, the polymer can be extruded through the spinneret at a relatively high throughput. For example, the polymer can be extruded through the spinneret at a throughput of not less than about 50% of that required to give excessive shear. This excessive shear can be detected in the process by a dramatic decrease in fiber tenacity and modulus with further increase in polymer throughput per hole. For example, in a spinneret of 0.0276" maximum diameter, and head and spinneret temperature of 270° C., at a draw ratio of 13 (maximum achievable), final speed of 250 m/min, and denier of 491 (13.6 g/min throughput), the fiber has 5.9 g/d tenacity. For the same spinneret, operating at a temperature of 300° C., draw ratio of 16 (maximum achievable), final speed of 160 m/min, and denier of 410 (7.3 g/min throughput), the tenacity is 8.0 g/d. The specific excessive shear throughput can generally vary depending upon one or more of the specific exudate material, the spinneret aperture size, as well as the exudate temperature. Excessive shear throughput values for any particular system and materials as well as methods of obtaining such are generally known to those of skill in the art, and thus a detailed discussion of this phenomenon is not included herein.

In addition to a relatively high throughput, the fibers or films can also be formed at a relatively low spinline tension. The combination of high throughput with low spinline tension can allow the fibers to be formed with a relatively low ratio of orifice size to final drawn fiber size as compared to other previously known monofilament fiber formation processes. Similarly, in the embodiment in which films can be formed according to the process, a relatively low ratio of die thickness to final drawn film thickness can be attained. For instance, the ratio of the maximum cross-sectional width of an orifice to the maximum cross-sectional distance of a single fully drawn fiber extruded through the orifice can, in one embodiment, be between about 2 and about 10. In one embodiment, this ratio can be between about 2 and about 8, and in another embodiment, between about 2 and about 5. Accordingly, the material forming each fiber can be in a fairly relaxed, disorganized state as it begins to cool and crystallize.

Referring again to FIG. 1, following extrusion of the polymer, the un-drawn fiber 9 can be quenched in a relatively warm liquid bath 16 and directed by roll 18. The liquid bath 16 in which the fiber 9 can be quenched can be a liquid in which the polymer is insoluble. For example, the liquid can be water, ethylene glycol, or any other suitable liquid as is generally known in the art.

In addition, in order to further encourage the formation of folded chain crystals in the fiber 9, the bath 16 can be heated. For example, the bath can be heated to a temperature near the maximum crystallization temperature ($T_c$) of the polymer. In particular, the temperature of the liquid bath 16 can be at least about 50° C. For example, the bath can be heated to a temperature of between about 50° C. and about 130° C. In one embodiment, the quench bath 16 can be at a temperature between about 70° C. and about 100° C. While not wishing to be bound by any particular theory, it is believed that by extruding the fibers at a relatively low spinline tension and high throughput combined with quenching the polymeric fiber in a hot liquid bath, the presently disclosed process encourages the formation of folded chain crystals in a highly disordered state in the polymer, which in turn enables a high draw ratio to be utilized in the process and thereby enables the formation of a monofilament fiber or tape fiber having high tenacity and/or modulus.

As is generally known in the art, polymers that are crystallized from a melt under dynamic temperature and stress conditions crystallize with the rate of crystallization dependent upon both the number of nucleation sites as well as on the growth rate of the polymer crystal. Moreover, both of these factors are in turn related to the conditions that the polymer is subject to as it is quenched. In addition, polymers that crystallize when in a highly oriented state tend to have limited tenacity and modulus as evidenced by the limited draw ratios possible for such highly oriented polymers. Thus, in order to obtain a fiber with high tenacity and modulus, crystallization of the polymer while in a highly disordered state is suggested. Accordingly, the present invention discloses a fiber formation process in which crystallization of the polymer in a highly disordered state is promoted by encouraging the fiber or film to maximize relaxation into the desired disoriented state during crystallization by forming the polymer at a relatively high throughput and low spinline tension. Optionally, a higher rate of crystallization can also be encouraged in certain embodiments through addition of a nucleating agent to the melt. In addition, quenching the formed polymer filaments in a warm liquid bath can promote the formation of folded chain crystals, which is also associated with the high draw ratios of high tenacity, high modulus materials.

As described, the individual fiber 9 can be extruded according to the disclosed process at relatively low spinline tension. As such, the roll 18 can operate at a relatively low speed. For example, the roll 18 can generally be set at a speed of less than about 25 meters per minute (m/min). In one embodiment, the roll 18 can be set at a speed of less than about 10 m/min. In one embodiment, the roll 18 can be set at a speed of between about 1 m/min and about 20 m/min, for instance between about 3 and about 10 m/min.

Generally, in order to encourage formation of fibers with substantially constant cross-sectional dimensions along the fiber length, excessive agitation of the bath 16 can be avoided during the process.

Figure 2:
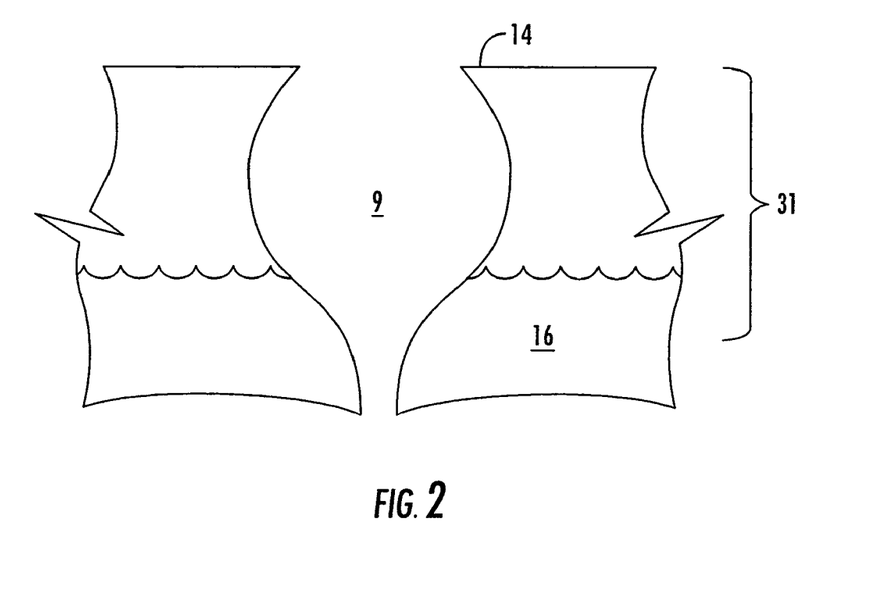
FIG. 2 illustrates the die swell of a single filament formed according to one embodiment of the present invention.

In one embodiment, quenching of the polymer can begin as soon as possible following exit from the spinneret, in order to encourage crystallization of the polymer while in the highly disoriented, relaxed state immediately following extrusion. For example, in one embodiment, the surface of the bath 16 can be located at a minimum distance from the spinneret 14. For instance, in the embodiment illustrated in FIG. 2, the surface of the bath 16 can be at a distance from the spinneret 14 such that an extruded fiber 9 can enter the bath 16 within the distance of the die swell 31 of the fiber 9. Optionally, the fiber 9 can pass through a heated or a non-heated shroud prior to entering the bath 16. For example, a heated shroud may be utilized in those embodiments where the distance between the orifice and the bath surface is greater than the die swell. In one embodiment, the distance between the spinneret and the bath can be less than about 2 inches. In another embodiment, this distance can be less than about 1 inch, or even less yet, for instance less than about ½ inch, or less than about ¼ inch, in some embodiments.

Roll 18 and roll 20 can be within bath 16 and convey fiber 9 through the bath 16. Dwell time of the material in the bath 16 can vary, depending upon particular materials included in the polymeric material, particular line speed, etc. In general, fiber 9 can be conveyed through bath 16 with a dwell time long enough so as to ensure complete quench, i.e., crystallization, of the polymeric material. For example, in one embodiment, the dwell time of the material in the bath 16 can be between about 6 seconds and about 1 minute.

At or near the location where the fiber 9 exits the bath 16, excess liquid can be removed from the fiber 9. This step can generally be accomplished according to any process known in the art. For example, in the embodiment illustrated in FIG. 1, the fiber 9 can pass through a series of nip rolls 23, 24, 25, 26 to remove excess liquid from the fiber. Other methods can be alternatively utilized, however. For example, in other embodiments, excess liquid can be removed from the fiber 9 through utilization of a vacuum, a press process utilizing a squeegee, one or more air knives, and the like.

In one embodiment, a lubricant can be applied to the fiber 9. For example, a spin finish can be applied at a spin finish applicator chest 22, as is generally known in the art. In general, a lubricant can be applied to the fiber 9 at a low water content. For example, a lubricant can be applied to the fiber 9 when the fiber is at a water content of less than about 75% by weight. Any suitable lubricant can be applied to the fiber 9. For example, a suitable oil-based finish can be applied to the fiber 9, such as Lurol PP-912, available from Ghoulston Technologies, Inc. Addition of a finishing or lubricant coat on the fiber can, in some embodiments of the invention, improve handling of the fiber during subsequent processing and can also reduce friction and static electricity build-up on the fiber.

After quenching of the fiber 9 and any optional process steps, such as addition of a lubricant for example, the fiber can be drawn while applying heat. For example, in the embodiment illustrated in FIG. 1, the fiber 9 can be drawn in an oven 43 heated to a temperature of between about 80° C. and about 190° C. Additionally, in this embodiment, the draw rolls 32, 34 can be either interior or exterior to the oven 43, as is generally known in the art. In another embodiment, rather than utilizing an oven as the heat source, the draw rolls 32, 34 can be heated so as to draw the fiber while it is heated. For example, the draw rolls can be heated to a temperature of between about 80° C. and about 190° C. In another embodiment, the fiber can be drawn over a hotplate heated to a similar temperature (i.e., between about 80° C. and about 190° C.). In one embodiment, the oven, draw rolls, hotplate, or any other suitable source of heat can be heated to a temperature of between about 120° C. and about 170° C.

According to the disclosed process, the fiber can be drawn in a first (or only) draw at a high draw ratio. For example, the fiber bundle 28 can be drawn with a draw ratio (defined as the ratio of the speed of the second or final draw roll 34 to the first draw roll 32) of greater than about 10. For instance, in one embodiment, the draw ratio of the first (or only) draw can be between about 10 and about 30. In another embodiment, the draw ratio can be greater than about 15. Additionally, the fiber can be wrapped on the rolls 32, 34 as is generally known in the art. For example, in one embodiment, between about 5 and about 15 wraps of the fiber can be wrapped on the draw rolls.

While the illustrated embodiment utilizes a series of draw rolls for purposes of drawing the fiber, it should be understood that any suitable process that can place a force on the fiber so as to elongate the fiber following the quenching step can optionally be utilized. For example, any mechanical apparatus including nip rolls, godet rolls, steam cans, air, steam, or other gaseous jets can optionally be utilized to draw the fiber.

According to the embodiment illustrated in FIG. 1, following the drawing step, the drawn fiber 30 can be cooled and wound on a take-up roll 40. In other embodiments, however, additional processing of the drawn fiber 30 may be carried out. For example, in one embodiment, the drawn fiber can be subjected to a second draw. In general, a second drawing step can be carried out at a higher temperature than the first draw. For instance, the heating element of the second drawing step can be heated to a temperature between about 10° C. and about 50° C. higher than the heating element of the first drawing step. In addition, a second draw can generally be at a lower drawing ratio that the first draw. For example, a second draw can be carried out at a draw ratio of less than about 5. In one embodiment, a second draw can be carried out at a draw ratio of less than about 3. In the case of multiple draws, the total draw ratio will be the product of each of the individual draws, thus a fiber first drawn at a draw ratio of 3, and then subsequently drawn at a draw ratio of 2 will have been subjected to a total draw ratio of 6.

Optionally, the drawn fiber can be heat set. For example, the fiber can be relaxed or subjected to a very low draw ratio (e.g., a draw ratio of between about 0.7 and about 1.3) and subjected to a temperature of between about 130° C. and about 150° C. for a short period of time, generally less than 3 minutes. In some embodiment, a heat setting step can be less than one minute, for example, about 0.5 seconds. This temperature can generally be higher than the drawing temperature(s). This optional heat set step can serve to "lock" in the crystalline structure of the fiber following drawing. In addition, it can reduce heat shrinkage, which may be desired in some embodiments.

In another embodiment, the drawn fiber can be surface treated to improve certain characteristics of the fiber, such as wettability or adhesion, for example. For instance, the fiber can be fibrillated, subjected to plasma or corona treatments, or can include an added surface fiber sizing, all of which are generally known in the art, to improve physical characteristics of the fibers.

In the embodiment including the formation of a film at the extruder, the tape fibers of the invention can be formed from the film either before or after the draw step, as desired. For example, in one embodiment the film can be subjected to a drawing step, and the drawn film can be further processed to form the tape fibers of the present invention. In another embodiment, the film can be processed to form the tape fibers first, and then the formed fibers can be drawn, as described above for the monofilament fiber 9. In either case, the tape fibers can be cut or formed from the film according to any process as is generally known in the art including, for example, use of metal blades, rotary knives, and the like.

In general, the finished fiber 30 can be wound on a spool or take-up reel 40, as shown, and transported to a second location for formation of a secondary product. In an alternative embodiment, however, the fiber can be fed to a second processing line, where the fiber can be further processed to form a secondary product, such as a woven fabric, for example.

The polypropylene fibers of the present invention can generally have a drawn size of between about 100 denier and about 50,000 denier. In another embodiment, the fibers of the present invention can have a drawn size between about 300 denier and 10,000 denier. Beneficially, the disclosed monofilament fiber can have a high tenacity and modulus, as measured in ASTM D2256-02, which is incorporated herein by reference, and as compared to other, previously known polypropylene monofilament fibers and tape fibers. For example, the disclosed fibers can have a tenacity greater than about 7 grams/denier. In one embodiment, the fibers can have a tenacity greater than about 8 grams/denier, or greater than 9 grams/denier, or even greater than 10 grams/denier.

In addition, the fibers of the present invention can have a high modulus, in general greater than about 125 grams/denier (10 GPa). For example, the disclosed fibers can exhibit a modulus greater than 150 grams/denier (12 GPa) in one embodiment. In another embodiment, the disclosed fibers can have a modulus greater than about 175 grams/denier (14 GPa), for example, or greater than about 200 g/d (16 GPa), greater than about 225 grams/denier (18 GPa), or greater than about 250 g/d (20 GPa), in some embodiments.

In addition, the disclosed fiber can exhibit relatively low elongation characteristics. For example, the fiber of the present invention can exhibit an elongation percentage of less than about 15%, as measured in ASTM D2256-02. In another embodiment, the fiber can exhibit less than about 10% elongation, for instance, less than about 8% elongation in some embodiments. In one embodiment, the fiber can exhibit even lower elongation, for instance, less than 6%.

The inventive fibers are also believed to possess a unique crystalline structure as compared to other, previously known polypropylene monofilament and tape fibers. There are several widely accepted means by which to measure molecular orientation in oriented polymer systems, among them scattering of light or X-rays, absorbance measurements, mechanical property analysis, and the like. Quantitative methods include wide angle X-ray scattering (WAXS), and small angle X-ray scattering (SAXS).

Figure 5:
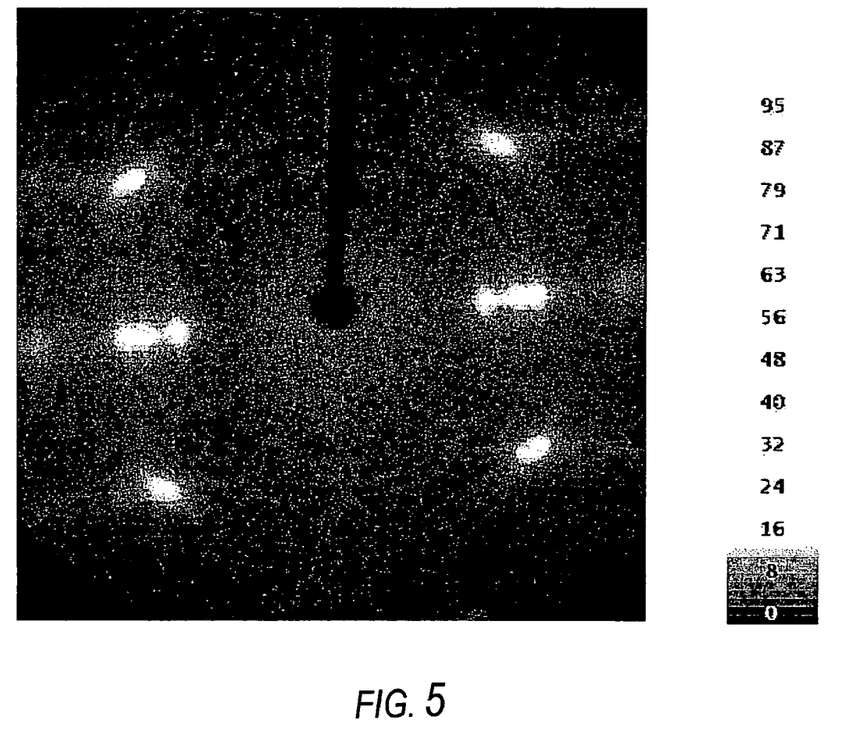
FIG. 5 is the WAXS scattering pattern of a polypropylene monofilament formed according to one embodiment of the presently disclosed process.

Through the utilization of WAXS and SAXS techniques, the disclosed fibers can be shown to be highly crystalline, highly oriented, with little or no lamellar structure. In particular, the fibers can possess greater than about 80% crystallinity according to WAXS measuring techniques described below. For example, FIG. 5 illustrates the WAXS scattering pattern of a single monofilament fiber formed according to the presently disclosed process. In particular, the fiber was extruded at 300° C. through a spinneret with a 0.0360 inch diameter orifice, quenched in a water bath at 70° C., and subjected to a single draw at a draw ratio of 16.25. The drawn fiber had a final denier of 747 grams/9000 m. As can be seen with reference to the Figure, where $0\phi$ is parallel to the yarn, the amorphous region of the disclosed yarns can be $2\theta$ from 10 to 30 and $\phi$ from 60 to 90 (the dark region near bottom of FIG. 5), and the crystalline region can be $2\theta$ from 10 to 30 and $\phi$ from −15 to 15 (including bright spots on the sides of FIG. 5). Thus by integrating the x-ray scattering intensity in the crystalline and amorphous regions, the crystallinity of the filament can be obtained as $$\frac{(I_X - I_A)}{(I_X)}$$

where: $I_X$ is the intensity in the crystalline region and $I_A$ is the intensity in the amorphous region.

In addition, the polyolefin yarns of the invention can be highly oriented, as shown by the narrow width of the WAXS peaks in FIG. 5.

Figure 6:
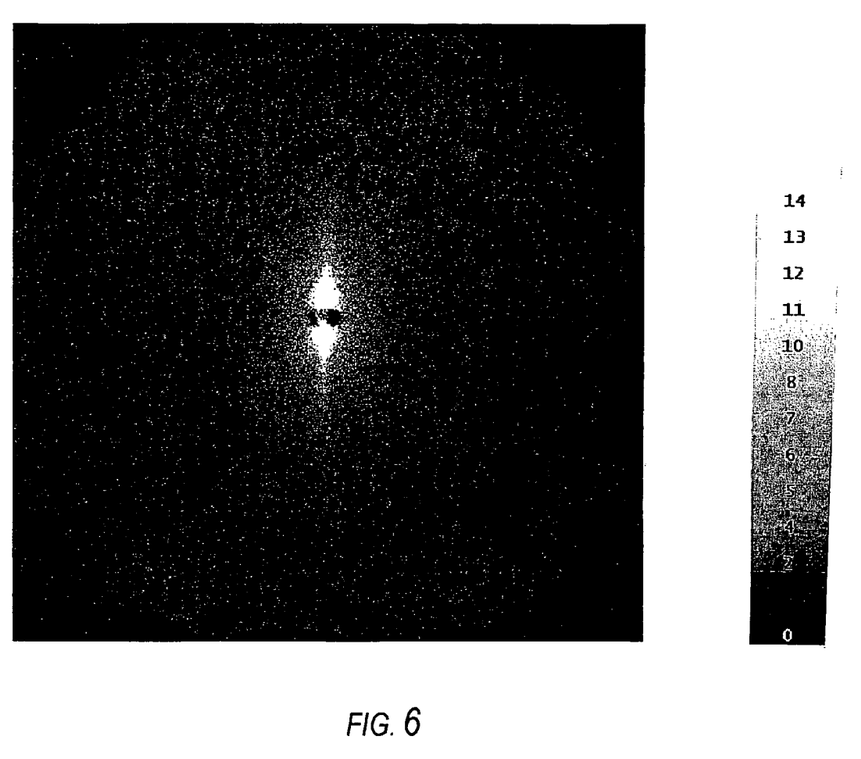
FIG. 6 is the SAXS scattering pattern of a polypropylene monofilament formed according to one embodiment of the presently disclosed process.

FIG. 6 is the SAXS pattern of another filament formed according to the same process as the filament shown in FIG. 5. Surprisingly, none of the expected structures relating to the crystalline form, orientation, and amorphous regions appear in the Figure, and the fiber appears to have no true amorphous regions at all, but appears to be composed entirely of crystalline regions and highly oriented amorphous regions.

SAXS patterns of monofilament fibers formed according to previously know methods generally include alternating crystalline and amorphous regions as illustrated by bright spots of scattering intensity in the yarn axis. (See, for example, *Polypropylene Fibers—Science and Technology*, M. Ahmed, Elsevier Scientific Publishing Company, 1982, pp. 192-203, which is incorporated herein by reference.) The positions of these spots can be utilized to obtain the long period spacing between repeating crystalline regions. The absence of these spots in FIG. 6 indicates that any amorphous regions in the inventive fiber of FIG. 6 have nearly identical electron density to the crystalline regions, and are thus composed of dense, highly oriented amorphous chains, or are absent altogether. When combined with the WAXS pattern of FIG. 5, which indicates that the amorphous intensity is at least 15%, it may be assumed that amorphous regions of the illustrated fibers most likely consist of the highly oriented chains.

In addition, the equatorial scattering in SAXS patterns in general arises from the center normal to the fiber axis and projects in a long, thin streak away from the center in each direction. In the inventive fibers, and in further reference to FIG. 6, these equatorial scattering streaks have amplified greatly, to the point that they are more aptly described as "wings." This equatorial scattering arises from fibrillation of the crystalline segments into more clearly defined needle-like assemblies. A long equatorial streak arises from a high concentration of cylindrical, shish-type structures in the fiber with the lamellae organized among or around the shishes, as "kabobs." These streaks generally appear in higher draw situations such as those of the present invention.

As can also be seen in FIG. 6, the fibers of the present invention formed under slow formation speeds and high draw conditions can describe a nearly absent meridonal reflection and an equatorial scattering that is strong such that the scattering ratio of equatorial to meridonal scattering intensity is high, but there remains strong density contrast as indicated by the overall intensity.

In general, the fibers of the present invention can have SAXS characteristics including a ratio of equatorial intensity to meridonal intensity of greater than about 1.0. In one embodiment, this ratio can be greater than about 1.5. Or greater yet in other embodiments, for instance greater than about 3.0. For instance, in one particular embodiment, the equatorial intensity was found to be 45642 and the meridonal intensity was found to be 29649, giving a ratio of 1.54. The fibers can generally exhibit an equatorial intensity integrated from $2\theta$ of between about 0.4 to about 1.0 and $\phi$ from about 60 to about 120 and from about 240 to about 300 (zero $\phi$ being parallel to the fiber, or horizontal in reference to FIG. 6). In addition, the fibers can exhibit a meridonal intensity integrated from $2\theta$ of between about 0.4 and about 1.0 and $\phi$ from about −60 to about 60 and from about 120 to about 240.

According to one embodiment of the present invention, the disclosed fibers can be beneficially utilized as formed as reinforcement material in a matrix. In other embodiments, following formation of the drawn fibers according to the disclosed processes, the fiber can be further processed prior to use as a reinforcement material in a matrix. For Instance, the fibers of the present invention can be chopped, fibrillated, flattened, bent, or otherwise deformed as is generally known in the art. Following any desired post-formation processes, the discrete fibers can be combined with a matrix material, and in one particular embodiment with a structural matrix material, to form a composite material suitable for forming a structure that can exhibit improved strength characteristics as compared to the structural matrix material that does not include the disclosed fibers.

Accordingly, in one embodiment, the present invention is directed to composite materials including the disclosed fibers in which the fibers can serve to reinforce the strength characteristics of the cured matrix material. In particular, the disclosed fibers can function as secondary reinforcement materials to the cured structure and improve both the strength (the ability of the cured matrix to resist crack initiation) as well as the fracture toughness (the ability of the structure to resist propagation of an existing crack in the structure) of the matrix. For purposes of this disclosure, secondary reinforcement should be distinguished from primary reinforcement, which refers to support of the structural matrix during cure.

In one embodiment, the composite materials can include a multitude of relatively short lengths of the fibers distributed throughout the matrix. For example, the composite materials of the present invention can include a multitude of monofilament fibers and/or tape fibers as herein described that have been cut or chopped to a length of less than about 5 inches. In one embodiment, the fibers can be less than about 3 inches in length, for instance, less than about 1 inch in length, and combined with a structural matrix material to form a strong composite material.

If desired, the fibers of the present invention can be combined with other reinforcement fibers in forming the disclosed composite materials. For example, an amount of the disclosed fibers and an amount of one or more any other type of reinforcement fiber as is generally known in the art can be combined with a matrix material to form a composite material as herein described. A non-limiting list of other types of reinforcement fibers can include, for example, steel fibers, carbon fibers, Kevlar® (poly-paraphenylene terephthalamide) fibers, ultra-high molecular weight polyethylene fibers, liquid crystal fibers, polyvinyl alcohol fibers, and glass fibers Suitable matrix material can generally be any materials commonly used in forming a three dimensional structure. For example, the matrix materials can include organic as well as inorganic matrix materials. A non-limiting list of exemplary matrix materials that can be combined with the disclosed fibers to form a reinforced composite material can include adhesives, asphalts, plastics, rubbers, and hydratable cementitious compositions including ready-mix or pre-cast concrete, masonry concrete, shotcrete, bituminous concrete, gypsum compositions, cement-based fireproofing compositions, and the like. The present invention has been found particular beneficial in one embodiment when considering reinforcement of brittle materials such as concretes and gypsums, for example, due to the large improvements in residual strength possible in the normally brittle materials upon combination with the disclosed fibers and formation of the composite materials.

In general, the various component materials of the disclosed composites can be mixed, cured and/or otherwise processed according to any standard method as is generally known in the art. For instance, the composite material can be batch mixed or continuously formed, as desired. The particular mixing and curing methods can generally depend upon the characteristics of the matrix materials. For example, the composite materials can be simply allowed to cure over a time in the environment in which they are formed, or alternatively can be subjected to a thermal cure. In one embodiment, the composite materials can include a crosslinking agent, the activity of which can be subject to specific conditions. For instance, the composite materials can include any of a variety of photoinitiated crosslinking agents as are generally known in the art, and the composite can cure upon application of light of a particular wavelength. In one embodiment, the composite material can include any of a wide variety of known epoxy or oxyrane-containing materials that can cross-link to cure the disclosed composite materials.

The composite materials of the present invention can exhibit improved structural characteristics as compared to previously known composite materials that utilize different reinforcement materials. While not wishing to be bound by any particular theory, the improved reinforcement characteristics exhibited by the disclosed composite materials is believed to be due not only to the improved mechanical characteristics of the individual fibers, i.e., modulus, tenacity, reduced elasticity, etc., but also to the fact that these improved mechanical characteristics lead to a much lower likelihood of slippage within the composite. In other words, due to the improved nature of the fibers themselves, the composite can exhibit improved strength characteristics. In addition, however, the improved fibers are also less likely to slip within the cured composite materials, and thus the composite can also exhibit improved fracture toughness as compared to composites that include previously known fiber reinforcement materials.

Moreover, it is also believed that the high crystallinity of the fibers can encourage an increased retention of bends, or deformations, which can in turn decrease the slippage experienced by the fiber. Specifically, in one embodiment, such bends or deformations can be created during the mixing and combining of the matrix material with the fibers, for example during combination of the fibers with a concrete containing coarse or fine aggregate in a concrete mixing truck or other mixing mechanism. In other embodiments, however, other methods of imparting deformations are envisioned, and the particular method of deforming the fibers is not critical to the present invention. In any case, it is believed that the high crystallinity of the inventive fibers can lead to a better retention of these bends or deformations such that the inventive fibers preferably bind to the matrix material and the composite material can exhibit improved secondary reinforcement characteristics.

Accordingly, the composite materials of the present invention can exhibit improved strength characteristics including, for example, improved average residual strength (ARS) characteristics (as measured according to ASTM C1399-04, which is incorporated herein by reference) and/or improved compressive strength characteristics, as compared to previously known composite materials including similar or even longer reinforcement fibers at the same or even greater fiber loading values. For example, a composite material including non-fibrillated, essentially round 0.75 inch monofilament fibers formed according to the present invention at a fiber loading value of 3 pounds per cubic yard (lbs/cy) can exhibit an ARS greater than 0.3 MPa, or greater than 0.5 MPa at a higher fiber load, for instance at about 6 lb/cy.

Compressive strengths of the composite materials can also be improved as compared to previously known materials. For example, at relatively low dosage rates, for instance, about 3 lbs/cy, composite materials including fibers of the present invention of a length of about 1 inch or greater can exhibit compressive strength (as measured by standard testing method ASTM C39/C39M-04a) greater than about 44 MPa. At higher load levels, the compressive strength of the disclosed materials can be even higher, at any fiber loading value. For example, at fiber load levels of about 6 lbs/cy or greater, the composite materials of the present invention can exhibit compressive strength of greater than about 50 MPa, even for quite short (e.g., about ¾ inch) fiber lengths.

Greater physical characteristics can be attained when the composite material includes slightly longer fibers of the present invention, for example, 1.5 inch fibers. For instance, the ARS can be considerably higher, for example greater than about 0.8 MPa at a fiber loading value of 3 lbs/cy, or greater than 1.0 at about 6 lb/cy.

In one embodiment, the fibers of the present invention can be further processed, for instance to include fibrillations, bends, hooks, and the like. For example, the fibers can be abraded, flattened, bent, or otherwise deformed according to any suitable process as is generally known to one of skill in the art. According to this embodiment, the disclosed composite materials can describe even higher strength characteristics, for example an ARS greater than about 1.0 MPa at a fiber loading value of about 3 lbs/cy with fibers of a length of less than about two inches.

In addition to increasing fiber loading values, improved strength characteristics can also be attained by increasing the length of the fibers included in the composite materials of the invention. For example, a relatively low fiber loading value can be used, for instance less than about 10 lb/cy, and longer fibers can be used, for example fibers between about 2 inches and about 5 inches in length, and very high strength characteristics can be attained, for example, an ARS greater than about 1.5 MPa in one embodiment, or greater yet, for example, greater than about 1.8 MPa, or greater than about 2.0 MPa, in some embodiments.

Due at least in part to the improved characteristics of the disclosed reinforcement fibers, in one embodiment of the disclosed invention, a predetermined strength and/or fracture toughness can be attained in a composite structural material and less total fiber reinforcement material need be added to the composite as compared to previously known polymer reinforced composite materials exhibiting similar strength characteristics. Thus, in addition to providing obvious cost benefits in the formation of the structural material, the disclosed process and materials can also be used avoid fiber clumping or "balling" of the reinforcement materials within the matrix during formation of the composite. In particular as clumping or balling of the reinforcement material tends to increase as fiber loading value and fiber length increases. Accordingly, the disclosed composite materials can have a better, more homogeneous dispersion of the reinforcement fibers throughout the matrix, which can also contribute to the improved strength characteristics of the cured composite materials.

The invention may be better understood with reference to the following Examples.

EXAMPLE 1

Monofilament fiber was formed on a system including a ¾ inch, 24:1 single screw extruder with three temperature zones, a head with a melt pump and spinneret, a liquid quench tank 40 inches long with two rollers within the tank, a vacuum water removal system, a spin finish applicator, three heated godet rolls, a forced air oven 120 inches in length, and a Leesona winder.

Atofina® 3281, 1.3 MFP polypropylene homopolymer was mixed at a weight ratio of 98:2 with a 10% concentrate of Millad® 3988 nucleating agent (3,4-dimethyl dibenzylidiene sorbitol). The materials were mixed in pellet form and fed into the extruder for melt mixing and extrusion.

The extruder temperatures were set as follows: Zone 1—110° C., Zone 2—250° C., Zone 3—300° C. The melt was extruded through a spinneret with a single hole 0.0360 inches in diameter. The spin head and the spin die were both heated to 300° C. The quench liquid was water and was heated to 70° C. The temperature of the oven was set to 160° C., and none of the godet rolls were heated. The godet roll speeds were 7 m/min, 8 m/min, and 130 m/min, respectively. The fiber slipped on the first roll, so the actual draw ratio of the single draw was 16.25. No spin finish was applied to the fiber.

The melt pump was set to deliver a filament at 700 denier. The fiber thus formed had an average tenacity of 7.4 g/d (592 MPa) and an elongation of 6.6% as measured by ASTM D2256-02, which is incorporated herein by reference. The fiber modulus was found to be 165 g/d (13.2 GPa) as measured by the same test.

EXAMPLE 2

Fibers formed as described above were cut to ¾ inch lengths on a Finn & Fram, Inc. Model 90 glass roving cutter. Fibers were mixed with concrete made according to the following mix materials and batch weights:

| Mix Number | 1 |
|---|---|
| Portland Cement (kg (lbs) | 306.8 (517) |
| Fly Ash, kg (lbs) | None |
| Admixture: Innegrity fiber, ¾" kg (lb) | 1.36 (3.0) |
| Fine Aggregate, kg (lbs) | 619 (1365) |
| Coarse Aggregate kg (lbs) | 771 (1700) |
| Water, kg (lbs) | 117 |

Mix number 2 was identical except that the amount of fiber was 2.72 kg (6.0 lbs) The Portland cement used was Type I (ASTM C 150). The fine aggregate was natural sand from Shiely Aggregates, meeting the requirements of ASTM C33 and C494. The coarse aggregate was limestone size no. 57 from Shiely Aggregates, meeting the requirements of ASTM 33 and C494.

Figure 3:
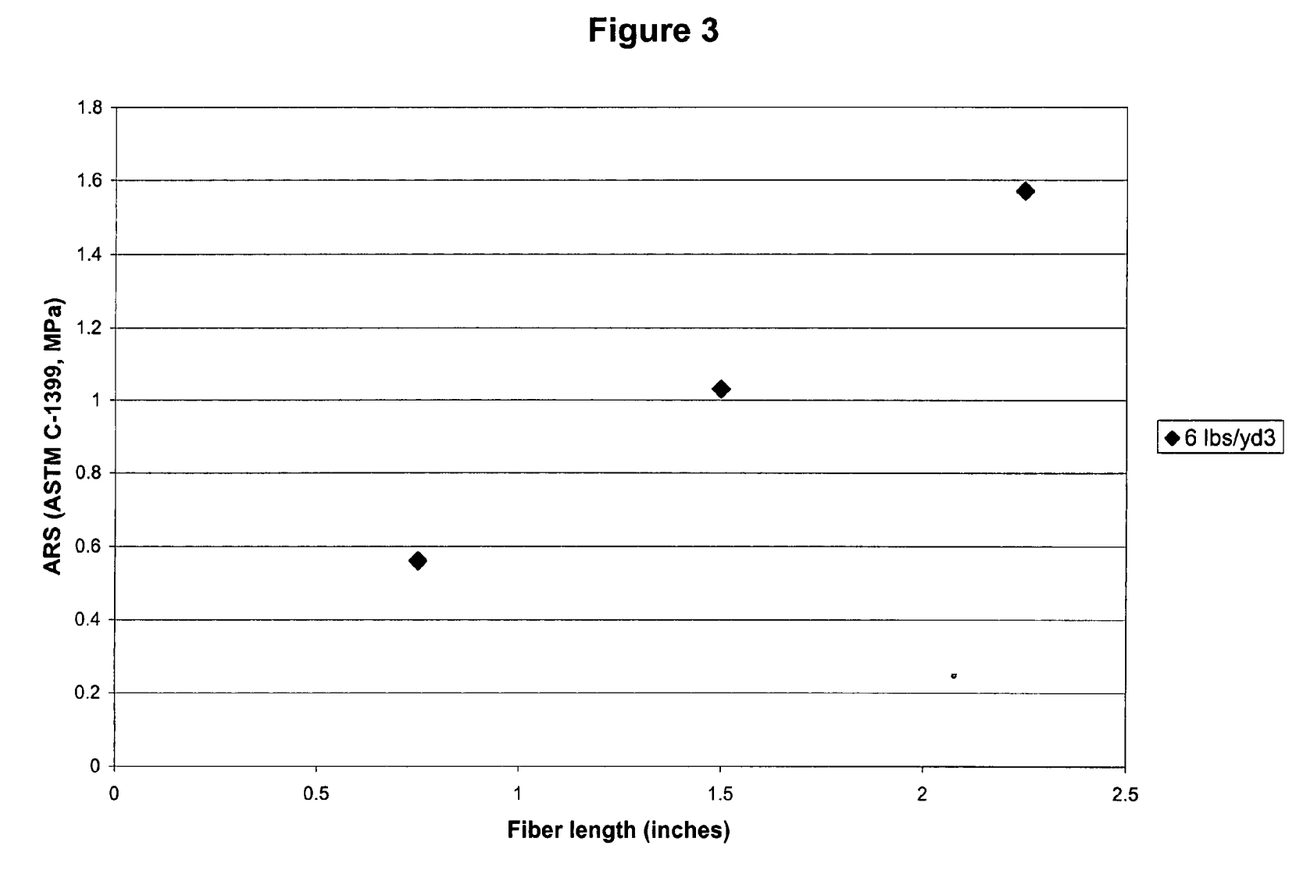
FIG. 3 graphically illustrates the increase in average residual strength (ARS) with increase in fiber length at a constant fiber loading value for blocks formed of a composite concrete material incorporating exemplary fibers of the present invention.
Figure 4:
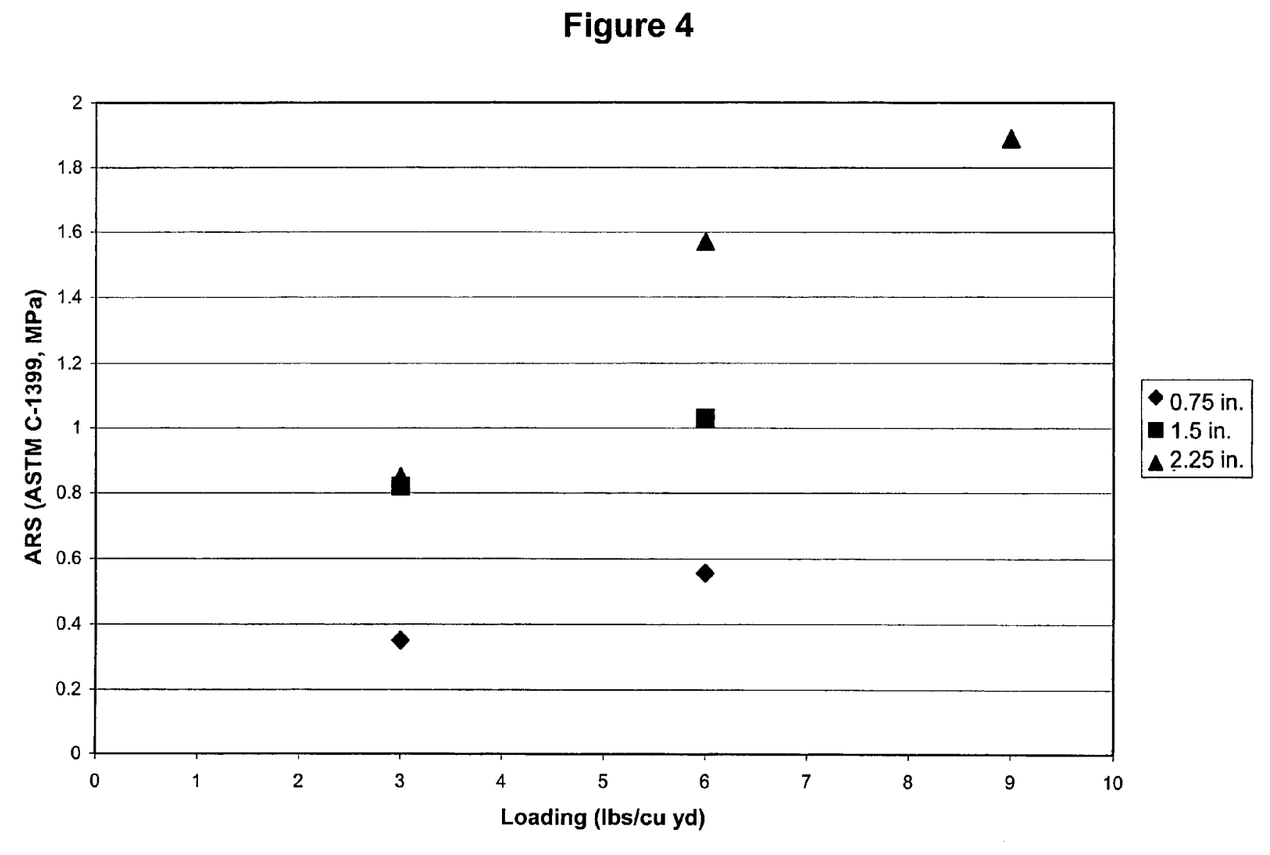
FIG. 4 graphically illustrates the increase in ARS with increase in fiber loading for blocks formed of a composite concrete material incorporating exemplary fibers of the present invention.

The concrete cast into molds and tested for residual strength and average residual strength according to ASTM C1399-04, previously incorporated by reference after curing for 28 days. Results are given below in Table 1 and on FIGS. 3 and 4. A control concrete sample was also prepared, identical to the composite materials, but for the exclusion of any reinforcing fibers. The control had a slump of 5¾ inches (146 mm), and air content of 2.4%, a unit weight of 148.4 lbs/ft³ (2376 kg/m³) and a compressive strength of 5800 psi (40.0 MPa).

TABLE I

| Fiber Loading | 3 lbs/cy | 6 lbs/cy |
|---|---|---|
| Slump in (mm) | 2¾ (70) | 3 (76) |
| Air content (%) | 2.3 | 3.2 |
| Unit Wt. lbs/ft³ (kg/m³) | 148 (2,370) | 149.6 (2,395) |
| Compressive Str, psi (MPa) | 5300 (36.5) | 7700 (53.1) |
| Sample Width, in (mm) | 4.07 (103) | 4.10 (104) |
| Sample Depth, in (mm) | 4.00 (102) | 4.00 (102) |
| Test Span, in (mm) | 12.00 (305) | 12.00 (305) |
| Load at 0.02 in (0.51 mm) Deflection | 267.8 (1191) | 438.5 (1950) |
| Load at 0.03 in (0.76 mm) Deflection | 272.1 (1210) | 461.8 (2054) |
| Load at 0.04 in (1.02 mm) Deflection | 272.6 (1213) | 440.6 (1960) |
| Load at 0.05 in (1.27 mm) Deflection | 271.8 (1209) | 425.0 (1890) |
| ARS, psi (MPa) | 50 (0.35) | 81 (0.56) |

EXAMPLE 3

Fibers formed as described above were cut to 1.5 inch lengths on a Finn & Fram, Inc. Model 90 glass roving cutter. Fibers were mixed with concrete having the same mixture ratios as in Example 2 at two fiber loading values, 3 lbs/cy and 6 lbs/cy and tested for load at deflection and average residual strength according to ASTM C1399-04, previously incorporated by reference. Results are given below in Table 2 and on FIGS. 3 and 4.

TABLE I

| Fiber Loading | 3 lbs/cy | 6 lbs/cy |
|---|---|---|
| Slump in (mm) | 3¼ (83) | 3 (76) |
| Air content (%) | 2.8 | 3.2 |
| Unit Wt. lbs/ft³ (kg/m³) | 148.9 (2,384) | 148.3 (2,375) |
| Compressive Str, psi (MPa) | 6500 (44.8) | 7600 (52.4) |
| Sample Width, in (mm) | 4.13 (105) | 4.08 (104) |
| Sample Depth, in (mm) | 4.00 (102) | 4.00 (102) |
| Test Span, in (mm) | 12.00 (305) | 12.00 (305) |
| Load at 0.02 in (0.51 mm) Deflection | 662.0 (2945) | 787.1 (3501) |
| Load at 0.03 in (0.76 mm) Deflection | 658.6 (2930) | 820.8 (3651) |
| Load at 0.04 in (1.02 mm) Deflection | 645.1 (2869) | 823.36 (3662) |
| Load at 0.05 in (1.27 mm) Deflection | 644.0 (2865) | 825.1 (3670) |
| ARS, psi (MPa) | 119 (0.82) | 149 (1.03) |

EXAMPLE 4

Fibers formed as described above were cut to 2.25 inch lengths by hand. Fibers were mixed with concrete having the same mixture ratios as in Example 2. Fibers were mixed at three fiber loading values, 3 lbs/cy, 6 lbs/cy and 9 lbs/cy and tested for load at deflection and average residual strength according to ASTM C1399-04, previously incorporated by reference. Results are given below in Table 2 and on FIGS. 3 and 4.

TABLE I

| Fiber Loading | 3 lbs/cy | 6 lbs/cy | 9 lbs/cy |
|---|---|---|---|
| Slump in (mm) | 3½ (89) | 3 (76) | 2¼ (83) |
| Air content (%) | 3.2 | 3.2 | 3.5 |
| Unit Wt. lbs/ft³ (kg/m³) | 148.2 (2,374) | 148.5 (2,379) | 148.9 (2,385) |
| Compressive Str, psi (MPa) | 7100 (48.9) | 7400 (51.0) | 7750 (53.4) |
| Sample Width, in (mm) | 3.98 | 4.17 | 4.17 |
| Sample Depth, in (mm) | 4.03 | 4.03 | 4.03 |
| Test Span, in (mm) | 12.00 | 12.00 | 12.00 |
| Load at 0.02 in (0.51 mm) Deflection | 639.6 (2845) | 1228.4 (5464) | 1432.1 (6370) |
| Load at 0.03 in (0.76 mm) Deflection | 663.3 (2950) | 1263.9 (5622) | 1565.9 (6966) |
| Load at 0.04 in (1.02 mm) Deflection | 679.5 (3023) | 1315.0 (5849) | 1602.2 (7127) |
| Load at 0.05 in (1.27 mm) Deflection | 682.7 (3037) | 1334.6 (5936) | 1608.4 (7154) |
| ARS, psi (MPa) | 123 (0.850) | 228 (1.57) | 275 (1.89) |

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A composite material comprising:
   a matrix material; and
   a plurality of discrete polymeric fibers defining a length of less than about 5 inches dispersed throughout the matrix material, wherein the polymeric component of the fibers is selected from the group consisting of polypropylene homopolymers, polypropylene copolymers and mixtures thereof, wherein the fibers describe an elastic modulus greater than about 10 GPa and an elongation less than about 10%, and wherein the composite material exhibits an average residual strength greater than about 1.5 MPa at a fiber load value of less than about 14 pounds of fibers per cubic yard of matrix material.

2. The composite material of claim 1, wherein the fibers describe an elastic modulus greater than about 14 GPa.

3. The composite material of claim 1, wherein the fibers describe an elastic modulus greater than about 16 GPa.

4. The composite material of claim 1, wherein the fibers describe an elongation less than about 8%.

5. The composite material of claim 1, wherein the fibers describe an elongation less than about 6%.

6. The composite material of claim 1, wherein the matrix material is a concrete.

7. The composite material of claim 1, wherein the matrix material is gypsum.

8. The composite material of claim 1, wherein the polymeric component of the fibers is polypropylene homopolymer.

9. The composite material of claim 1, wherein the composite material exhibits a fiber loading value between about 5 and about 7 pounds of fibers per cubic yard of matrix material describes an average residual strength greater than 1.80 MPa.

10. The composite material of claim 1, wherein the fibers comprise monofilament fibers.

11. The composite material of claim 1, wherein the fibers are fibrillated or deformed.

12. The composite material of claim 1, wherein the fibers are monofilament fibers and the composite material describes an average residual strength greater than or equal to 2 Mpa.

13. The composite material of claim 1, the material further comprising a second plurality of discrete fibers, the second plurality of discrete fibers being selected from the group consisting of steel fibers, carbon fibers, poly-paraphenylene terephthalamide fibers, ultra-high molecular weight polyethylene fibers, liquid crystal fibers, polyvinyl alcohol fibers, and glass fibers.

* * * * *